(12) United States Patent
Yoshitomi et al.

(10) Patent No.: US 9,912,269 B2
(45) Date of Patent: Mar. 6, 2018

(54) MOTOR DRIVE CIRCUIT AND ILLUMINATION APPARATUS AND METHOD

(71) Applicant: Semiconductor Components Industries, LLC, Phoenix, AZ (US)

(72) Inventors: Tetsuya Yoshitomi, Gunma-ken (JP); Masashi Tanabe, Ota (JP); Syunji Suzuki, Gunma-ken (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 477 days.

(21) Appl. No.: 14/279,641

(22) Filed: May 16, 2014

(65) Prior Publication Data

US 2014/0246995 A1 Sep. 4, 2014
US 2016/0056742 A9 Feb. 25, 2016

Related U.S. Application Data

(63) Continuation of application No. 13/070,348, filed on Mar. 23, 2011, now Pat. No. 8,736,214.

(30) Foreign Application Priority Data

Mar. 24, 2010 (JP) .................. 2010-068644

(51) Int. Cl.
*H02P 6/22* (2006.01)
*H02P 6/30* (2016.01)

(52) U.S. Cl.
CPC . *H02P 6/22* (2013.01); *H02P 6/30* (2016.02)

(58) Field of Classification Search
CPC ..................................... H02P 6/22; H02P 6/30
(Continued)

(56) References Cited

U.S. PATENT DOCUMENTS 4,499,408 A * 2/1985 Bitting ..................... H02P 6/30
318/400.04
6,531,839 B1 * 3/2003 Shin .......................... H02P 6/24
318/362

(Continued)

FOREIGN PATENT DOCUMENTS

JP 05-080437 4/1993
JP 07-035455 2/1995
(Continued)

*Primary Examiner* — Kawing Chan
(74) *Attorney, Agent, or Firm* — Rennie William Dover (57) ABSTRACT

A motor-drive circuit includes: an output transistor configured to supply a drive current to a motor for a cooling fan; a switching-control circuit configured to control switching of the output transistor so that the motor rotates in a first direction, or rotates in a second direction opposite to the first direction; and a switching circuit configured to, when a first time has elapsed since start of rotation of the motor in the first direction, cause the switching-control circuit to start switching control so that the motor stops rotating in the first direction and thereafter rotates in the second direction, and configured to, when a second time has elapsed since start of rotation of the motor in the second direction, cause the switching-control circuit to start switching control so that the motor stops rotating in the second direction and thereafter rotates in the first direction.

22 Claims, 7 Drawing Sheets

(58) Field of Classification Search
USPC .......................................................... 318/471
See application file for complete search history.

(56) References Cited

U.S. PATENT DOCUMENTS

| | | |
|---|---|---|
| 6,608,459 B2 | 8/2003 | Kasagami et al. |
| 7,180,738 B2 | 2/2007 | Mandel et al. |
| 7,728,540 B2 | 6/2010 | Sugie |
| 2006/0097675 A1 | 5/2006 | Hsu |
| 2006/0291994 A1 | 12/2006 | Bok et al. |
| 2007/0001634 A1 | 1/2007 | Wei et al. |
| 2008/0310967 A1 | 12/2008 | Franz et al. |
| 2010/0332857 A1* | 12/2010 | Vogman .................. G06F 1/263 713/300 |
| 2011/0018445 A1 | 1/2011 | Horng et al. |
| 2012/0086379 A1 | 4/2012 | Horng et al. |
| 2013/0033180 A1 | 2/2013 | Horng et al. |
| 2013/0114253 A1 | 5/2013 | Segawa et al. |

FOREIGN PATENT DOCUMENTS

| | | |
|---|---|---|
| JP | 2004-064010 | 2/2004 |
| JP | 2004-193357 | 7/2004 |
| JP | 2008-122538 | 5/2008 |

\* cited by examiner

MOTOR DRIVE CIRCUIT AND ILLUMINATION APPARATUS AND METHOD

CROSS-REFERENCE TO RELATED APPLICATION

The present application is a continuation application of U.S. patent application Ser. No. 13/070,348 filed on Mar. 23, 2011, by Tetsuya Yoshitomi et al., titled "Motor Drive Circuit and Illumination Apparatus" which is hereby incorporated by reference in its entirety, and priority thereto for common subject matter is hereby claimed.

BACKGROUND OF THE INVENTION

Field of the Invention

The present invention relates to a motor drive and an illumination apparatus circuit Description of the Related Art Recently, an LED (Light Emitting Diode) is used for an illuminating purpose as well. In particular, since the LED has a longer life as compared with an incandescent bulb, it is suitable for being used in an illumination apparatus to be installed in a place inconvenient for replacement such as a ceiling.

On the other hand, the LED has lower heat generation than that of the incandescent lamp but is susceptible to heat, thereby requiring appropriate cooling using a heat sink, etc., to prevent reduction in efficiency and life.

For example, Japanese Patent Laid-Open Publication No. 2004-193357 discloses a technique for releasing the heat of an LED bare chip to a metal base of a printed circuit board.

Even in a configuration disclosed in Japanese Patent Laid-Open Publication No. 2004-193357, however, it is not ensured that the heat conducted to the metal base is sufficiently released to the outside, and thus it is desired that efficiency in heat release be further enhanced so that reduction in luminous efficiency of the LED is prevented.

In light of the foregoing, an object of the present invention is to provide a motor drive circuit which is preferable for a cooling fan of an LED illumination, etc., and an illumination apparatus including the same.

SUMMARY OF THE INVENTION

A motor drive circuit according to an aspect of the present invention, includes: an output transistor configured to supply a drive current to a drive coil of a motor configured to cause a fan to rotate so as to blow air to cool an object to be cooled; a switching control circuit configured to control switching of the output transistor so that the motor rotates in a first direction to cool the object to be cooled, or rotates in a second direction opposite to the first direction; and a switching circuit configured to, when a first time has elapsed since start of rotation of the motor in the first direction, cause the switching control circuit to start switching control so that the motor stops rotating in the first direction and thereafter rotates in the second direction, and configured to, when a second time has elapsed since start of rotation of the motor in the second direction, cause the switching control circuit to start switching control so that the motor stops rotating in the second direction and thereafter rotates in the first direction.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

<Outline of Configuration of Illumination Apparatus as a Whole>

An outline will hereinafter be described of a configuration of an illumination apparatus as a whole including a motor drive circuit according to an embodiment of the present invention, which will be described later, with reference to FIG. 2. Detailed description will be given later of a configuration of a motor drive circuit 1.

Figure 2:
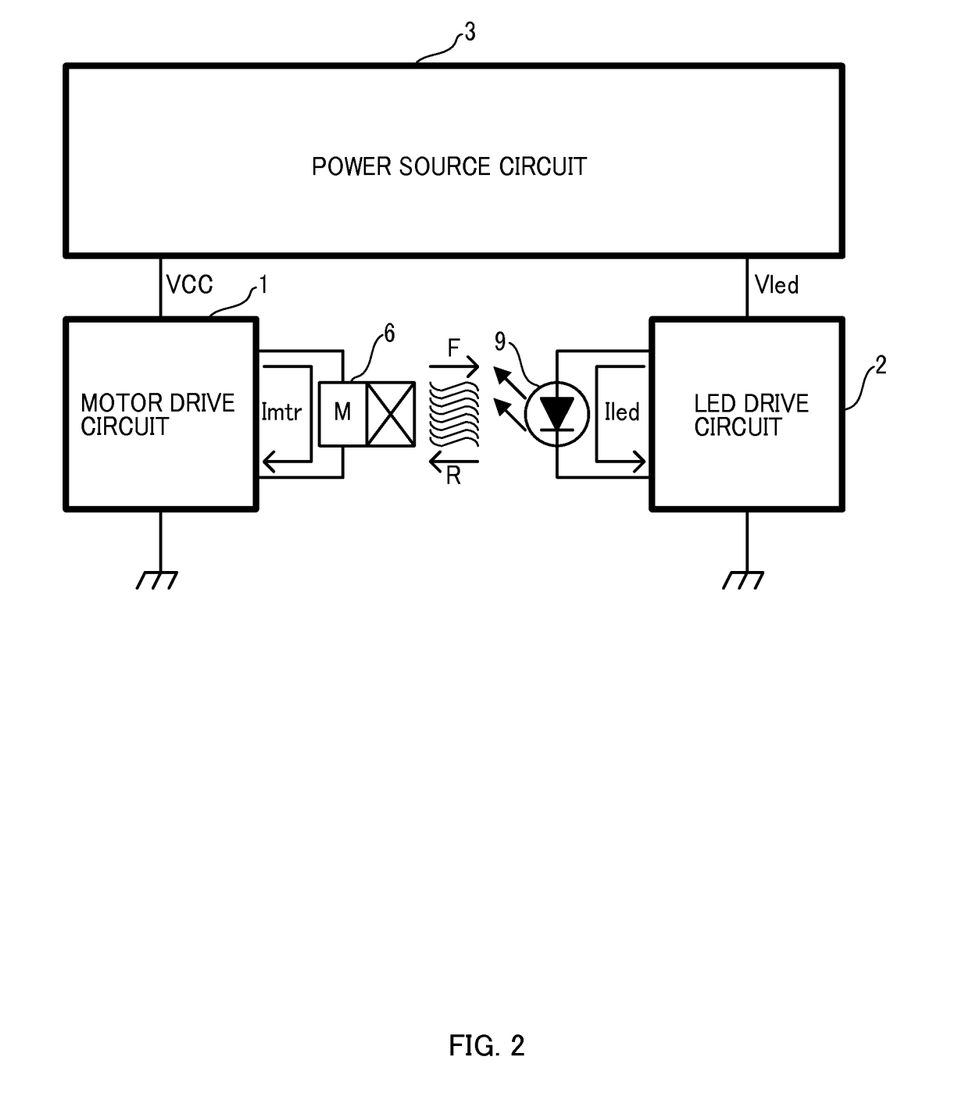
FIG. 2 is a block diagram illustrating an outline of a configuration of an illumination apparatus as a whole including a motor drive circuit according to one embodiment of the present invention.

The illumination apparatus shown in FIG. 2 is an illumination apparatus employing an LED as an illumination element, and includes the motor drive circuit 1, an LED drive circuit 2, a power supply circuit 3, a motor 6, and an LED 9. The motor drive circuit 1 and the LED drive circuit 2 are connected to the power supply circuit 3. Further, the motor 6 is connected to the motor drive circuit 1 and the LED 9 is connected to the LED drive circuit 2. It is assumed that the rotating shaft of the motor 6 is connected to a fan, but the motor 6 may be configured to be integrated into a fan motor with the fan.

<Outline of Operation of Illumination Apparatus as a Whole>

An outline will then be described of an operation of the illumination apparatus as a whole. Detailed description will be given later of an operation of the motor drive circuit 1.

The LED drive circuit 2 is supplied with a power supply voltage Vled from the power supply circuit 3. The LED drive circuit 2 supplies a constant current Iled to the LED 9, and causes the LED 9 to emit light. In general, a white-light LED for an illumination purpose is used as the LED 9, but an organic LED, which is also called an organic EL (Electro-Luminescence), may be used.

The motor drive circuit 1 is supplied with a power supply voltage VCC from the power supply circuit 3. The motor drive circuit 1 supplies drive currents Imtr to drive coils (shown in FIG. 1, which will be described later) of the motor 6, and causes the motor 6 to rotate. The fan connected to the rotating shaft of the motor 6 blows air in the direction of an arrow F or an arrow R in FIG. 6 according to the rotating direction of the motor 6.

Figure 6:
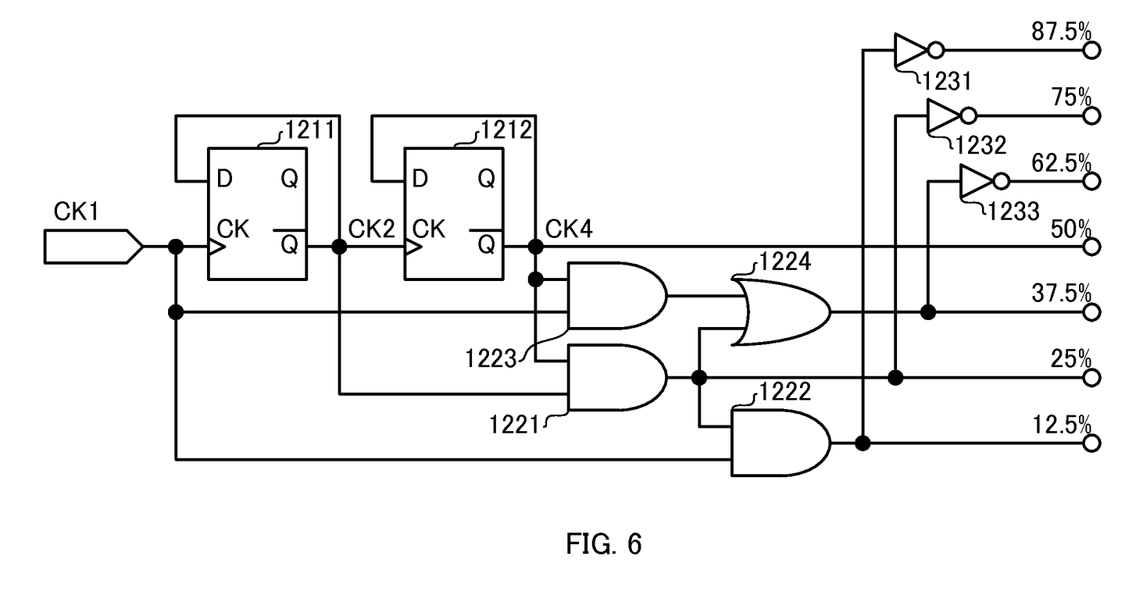
FIG. 6 is a circuit block diagram illustrating another configuration of a circuit configured to generate a PWM 0% signal to a PWM 100% signal.

The arrow F indicates the air blowing direction in the case of blowing air from the fan to the LED 9 itself and a heat sink assembled to the LED 9 in order to cool (heat-dissipating) the LED 9, and the rotation of the motor 6 in this case is hereinafter referred to as a forward rotation (rotation in a first direction). On the other hand, the arrow R indicates the air blowing direction in the case of blowing air in the direction opposite to that of the arrow F in order to remove dust inside the illumination apparatus, and the rotation of the motor 6 in this case is hereinafter referred to as a reverse rotation (rotation in a second direction).

As such, the illumination apparatus causes the motor 6 to drive the forward rotation to cool the LED 9 as well as causes it to drive the reverse rotation to remove the dust of the inside thereof.

<Configuration of Motor Drive Circuit>

A configuration will hereinafter be described of the motor drive circuit according to an embodiment of the present invention with reference to FIG. 1. In the following, a description will be given of a case where a sensorless three-phase motor is used as one example of the motor 6. A detailed description will be given later of configurations of the switching control circuit 12, the switching circuit 13, and the overheat detecting circuit 14.

Figure 1:
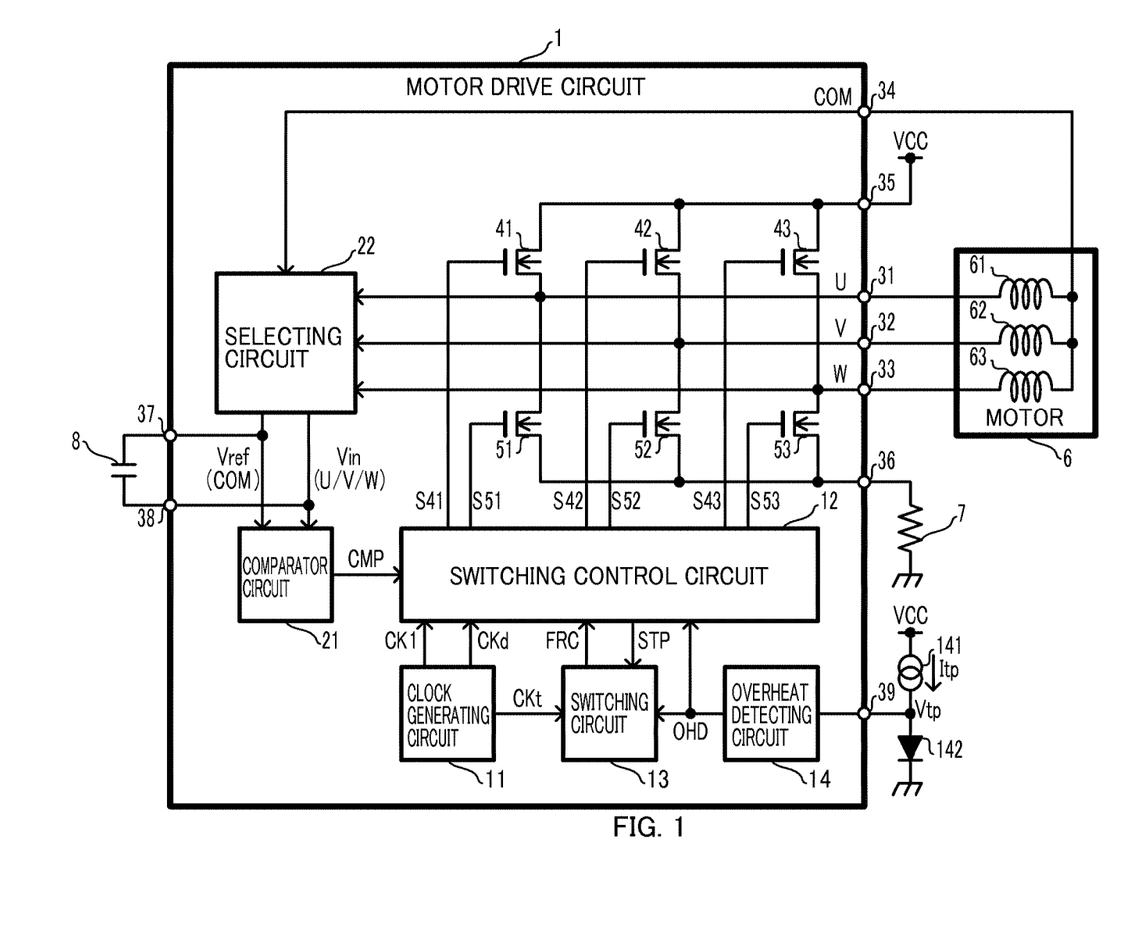
FIG. 1 is a circuit block diagram illustrating a configuration of a motor drive circuit according to one embodiment of the present invention.

The motor drive circuit 1 illustrated in FIG. 1 is a circuit configured to drive the motor 6 including drive coils 61 to 63 of three phases, and is configured as an integrated circuit provided with terminals 31 to 39. The motor drive circuit 1 includes a clock generating circuit 11, the switching control circuit 12, the switching circuit 13, the overheat detecting circuit 14, a comparator circuit 21, a selecting circuit 22, and output transistors 41 to 43 and 51 to 53. Further, a resistor 7, a capacitor 8, a current source 141, and a diode 142 in addition to the motor 6 are connected to the motor drive circuit 1.

In the following, a description will be given of a case where, by way of example, an N-channel power MOSFET (Metal-Oxide Semiconductor Field-Effect Transistor) is employed as each of the output transistors. Phases of the drive coils 61 to 63 are given as a U-phase, a V-phase, and a W-phase, respectively.

Drains of the output transistors 41 to 43 on a higher side (power source side) are connected to a power supply potential VCC via the terminal 35. Sources of the output transistors 51 50 53 on a lower-side (ground side) is connected to a ground potential via the resistor 7 externally connected to the terminal 36. Further, the output transistors 41 to 43 are connected in series to the output transistors 51 to 53, respectively, and connection points of the transistors 41 and 51, the transistors 42 and 52, and the transistors 43 and 53 are connected to the terminals 31, 32, and 33, respectively. The drive coils 61 to 63 are connected to the terminals 31 to 33 and a neutral point of the drive coils 61 to 63 is connected to the terminal 34.

Voltages U, V, W, and COM of the terminals 31, 32, 33, and 34 are inputted to the selecting circuit 22, respectively. An input voltage Vin and a reference voltage Vref are inputted from the selecting circuit 22 to the comparator 21. Further, the capacitor 8 is externally connected between the signal lines of the input voltage Vin and the reference voltage Vref via the terminals 37 and 38. A comparison result signal CMP outputted from the comparator circuit 21 is inputted to the switching control circuit 12.

A clock signal CK1 (first clock signal) and a clock signal CKd are inputted from the clock generating circuit 11 to the switching control circuit 12. A clock signal CKt is inputted from the clock generating circuit 11 to the switching circuit 13.

The anode of the diode 142 is externally connected to the overheat detecting circuit 14 via the terminal 39. The anode of the diode 142 is supplied with a constant current Itp from the current source 141 connected to the power supply potential VCC, and the cathode thereof is connected to the ground potential. An overheat detection signal OHD outputted from the overheat detecting circuit 14 is inputted to the switching control circuit 12 and the switching circuit 13.

A motor stop signal STP is inputted from the switching control circuit 12 to the switching circuit 13 and a forward/reverse control signal FRC is inputted from the switching circuit 13 to the switching control circuit 12. Switching signals S41 to S43 and S51 to S53 outputted from the switching control circuit 12 are inputted to the gates of the output transistors 41 to 43 and 51 to 53, respectively.

<Operation of Motor Drive circuit>

An operation will then be described of the motor drive circuit according to an embodiment of the present invention. A detailed description will be given later of an operation of the switching control circuit 12, the switching circuit 13, and the overheat detecting circuit 14.

The output transistors 41 to 43 and 51 to 53 have their switching controlled according to the switching signals S41 to S43 and S51 to S53, which are binary signals, respectively, to supply the drive currents to the drive coils 61 to 63 of the motor 6. For example, when the output transistors 41 and 52 are ON, the drive current flows from the power supply potential VCC to the ground potential via the output transistor 41, the drive coils 61 and 62, the output transistor 52, and the resistor 7. Therefore, in this case, the drive current flows from the U-phase to the V-phase. For example, when the output transistors 43 and 52 are ON, the drive current flows from the W-phase to the V-phase.

The selecting circuit 22 sequentially selects any one of the voltages U, V, and W of the terminals 31 to 33 (U-phase, V-phase, and W-phase), respectively, and inputs the selected voltage to the comparator circuit 21 as the input voltage Vin. The selecting circuit 22 inputs the voltage COM (neutral point of drive coils 61 to 63) to the comparator circuit 21 as the reference voltage Vref. Further, the capacitor 8 are connected between the signal lines of the input voltage Vin and the reference voltage Vref, and functions as a filter for removing noise of the input signals of the comparator circuit 21. The comparator circuit 21 compares the input voltage Vin and the reference voltage Vref and outputs a result of the comparison as the comparison result signal CMP which is a binary signal.

The clock generating circuit 11 outputs the clock signals CK1, CKd, and CKt. The diode 142 is disposed in the vicinity of the LED 9, and the overheat detecting circuit 14 outputs the overheat detection signal OHD based on a forward drop voltage Vtp of the diode 142.

The switching circuit 13 includes a counter circuit (shown in FIG. 3 which will be described later) configured to be cleared (reset) in response to the motor stop signal STP and count according to the clock signal CKt, and measures an elapsed time since the start of the rotation in the current direction of the motor 6. The switching circuit 13 outputs the forward/reverse control signal FRC indicative of the rotating direction of the motor 6 according to the elapsed time and the overheat detection signal OHD. It is assumed that the forward/reverse control signal FRC indicates the forward rotation when FRC=1 and the reverse rotation when FRC=0.

The switching control circuit 12 detects the position of a rotor of the motor 6 based on the comparison result signal CMP. The switching control circuit 12 generates a PWM (Pulse Width Modulation) signal, using the clock signals CK1 and CKd and the overheat detection signal OHD. Further, the switching control circuit 12 generates the switching signals S41 to S43 and S51 to S53 so that the motor 6 rotate in the forward or reverse direction, according to the position of the rotor, the PWM signal, and the forward/reverse control signal FRC. The switching signals S41 to S43 and S51 to S53 are supplied to the output transistors 41 to 43 and 51 to 53, respectively. As such, the motor drive circuit 1 generates the forward/reverse control signal FRC according to the elapsed time since the start of the rotation in the current direction of the motor 6, and switches the rotating direction of the motor 6 according to the forward/reverse control signal FRC. Therefore, the illumination apparatus illustrated in FIG. 2 is capable of cooling the LED 9 while removing the dust of the inside thereof.

<Configurations of Switching Control Circuit, Switching Circuit, and Overheat Detecting Circuit>

Figure 3:
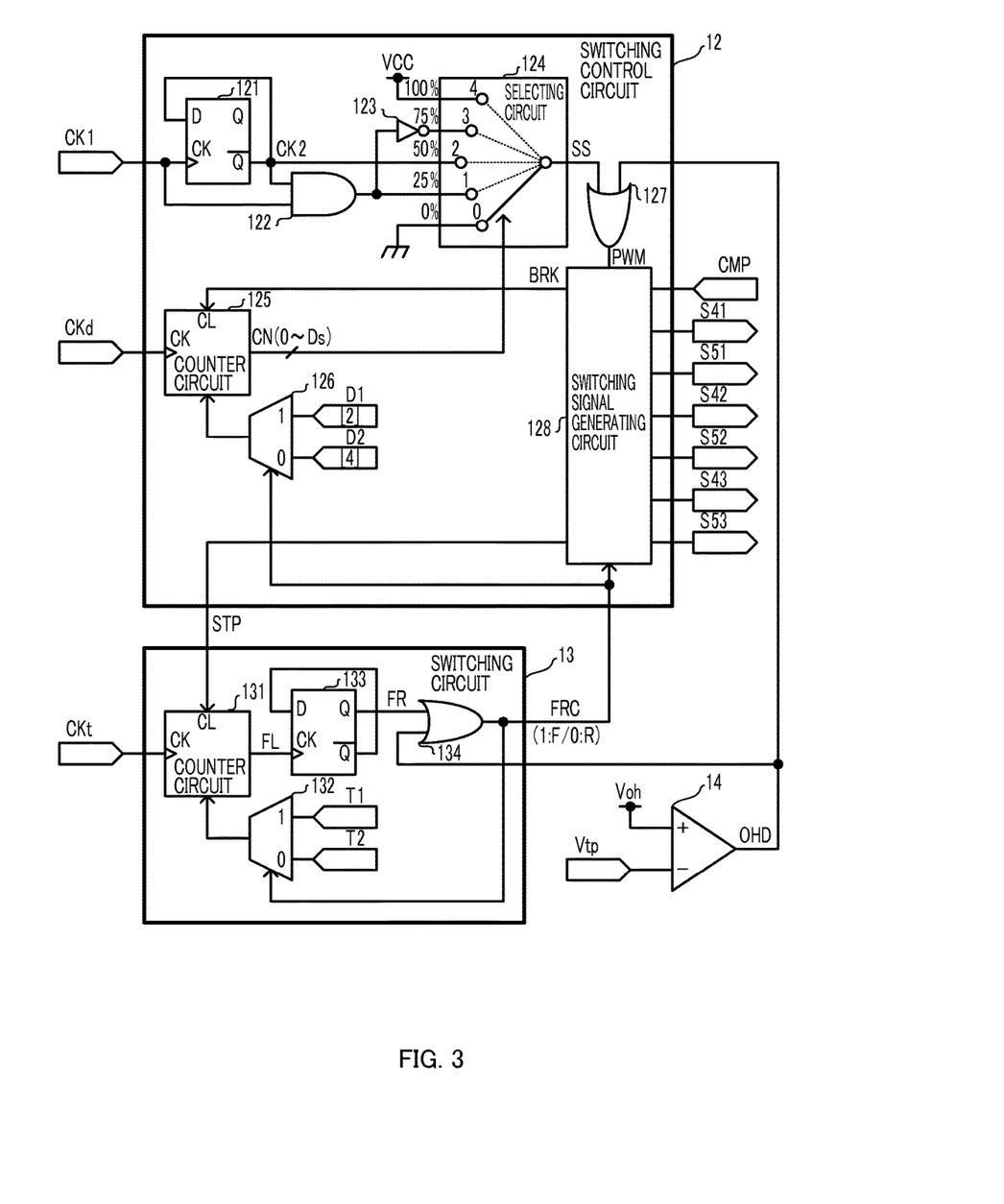
FIG. 3 is a circuit block diagram illustrating one example of specific configurations of a switching control circuit 12, a switching circuit 13, and an overheat detecting circuit 14.

The configurations will hereinafter be described of the switching control circuit 12, the switching circuit 13, and the overheat detecting circuit 14 with reference to FIG. 3.

The switching control circuit 12 includes a DFF (D-type flip-flop) 121, an AND circuit (logical AND circuit) 122, an inverter (inverting circuit) 123, selecting circuits 124 and 126, a counter circuit 125, an OR circuit (logical OR circuit) 127, and a switching signal generating circuit 128, for example. In the switching control circuit 12, the DFF 121, AND circuit 122, inverter 123, selecting circuits 124 and 126, counter circuit 125, and OR circuit 127, excluding the switching signal generating circuit 128, correspond to a PWM circuit.

The clock signal CK1 is inputted to a CK input (clock input) of the DFF 121 and a clock signal CK2 (second clock signal), which is an inverted output signal, is fed back to a D input (data input) thereof. The clock signals CK1 and CK2 are inputted to the AND circuit 122, and the output signal of the AND circuit 122 is inputted to the inverter 123.

The selecting circuit 126 is configured as a 2-input, 1-output (2 to 1) multiplexer, and the forward/reverse control signal FRC is inputted to a selection control input thereof. Full count values D1 and D2 are inputted to data inputs corresponding to FRC=1 and FRC=0, respectively, and an output value of the selecting circuit 126 is inputted to the counter circuit 125. Further, the clock signal CKd is inputted to a CK input of the counter circuit 125, and a motor brake signal BRK is inputted from the switching signal generating circuit 128 to a CL input (clear input) of the counter circuit 125. Then, a count value CN is outputted from the counter circuit 125.

The selecting circuit 124 is configured as a 5-input, 1-output (5 to 1) multiplexer, and the count value CN of the counter circuit 125 is inputted to a selection control input thereof. The output signal of the AND circuit 122, the clock signal CK2, and the output signal of the inverter 123 are inputted to the data inputs corresponding to CN=1 to CN=3, respectively. Further, the data inputs corresponding to CN=0 and CN=4 are fixed to a low-level and a high-level, respectively. A soft start signal SS is outputted from the selecting circuit 124.

The soft start signal SS and the overheat detection signal OHD are inputted to the OR circuit 127, and the PWM signal is outputted from the OR circuit 127. The comparison result signal CMP, the PWM signal, and the forward/reverse control signal FRC are inputted to the switching signal generating circuit 128. The switching signals S41 to S43 and S51 to S53, the motor brake signal BRK, and the motor stop signal STP are outputted from the switching signal generating circuit 128.

The switching circuit 13 includes a counter circuit 131, a selecting circuit 132, a DFF 133, and an OR circuit 134, for example.

The selecting circuit 132 is configured as a 2-input, 1-output (2 to 1) multiplexer, and the forward/reverse control signal FRC is inputted to a selection control input thereof. Full count values T1 and T2 are inputted to data inputs corresponding to FRC=1 and FRC=0, respectively, and an output value of the selecting circuit 132 is inputted to the counter circuit 131. Further, the clock signal CKt is inputted to a CK input of the counter circuit 131, and the motor stop signal STP is inputted from the switching signal generating circuit 128 to a CL input thereof. Then, a full count signal FL is outputted from the counter circuit 131.

The full count signal FL is inputted to the CK input of the DFF 133, and a forward/reverse signal FR is outputted from the DFF 133. An inverted output signal of the DFF 133 is fed back to a D input thereof. The forward/reverse signal FR and the overheat detection signal OHD are inputted to the OR circuit 134, and the forward/reverse control signal FRC is outputted from the OR circuit 134.

The overheat detecting circuit 14 includes a comparator circuit, for example. The forward drop voltage Vtp of the diode 142 is inputted to an inverting input of the comparator circuit, and an overheat detection voltage Voh is applied to a non-inverting input thereof. The overheat detection signal OHD is outputted from the comparator circuit. The overheat detection voltage Voh is the forward drop voltage Vtp of the diode 142 at an overheat detection temperature Toh (predetermined temperature).

<Operations of Switching Control Circuit, Switching Circuit, and Overheat Detecting Circuit>

Figure 4:
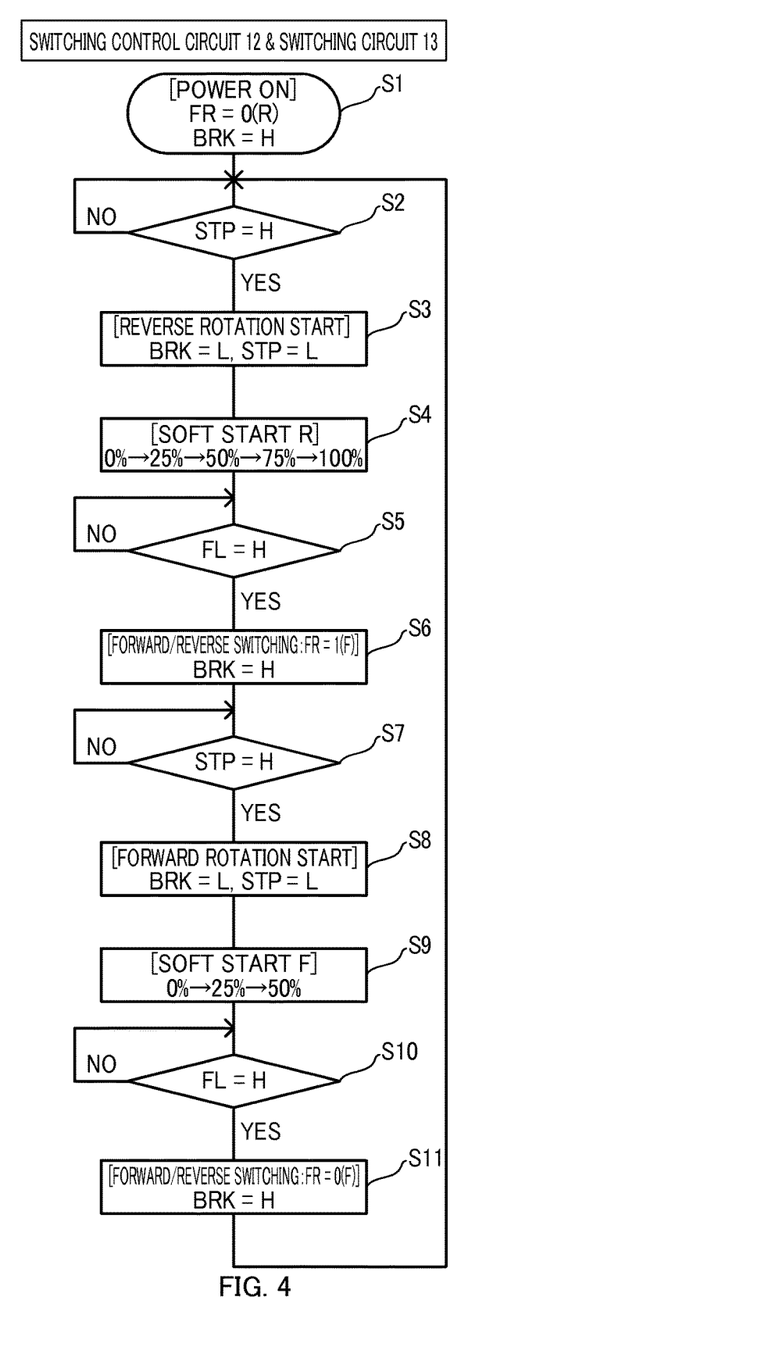
FIG. 4 is a flowchart illustrating an operation of a switching control circuit 12 and a switching circuit 13 when a temperature Ttp of an LED 9 is lower than an overheat detection temperature Toh.
Figure 5:
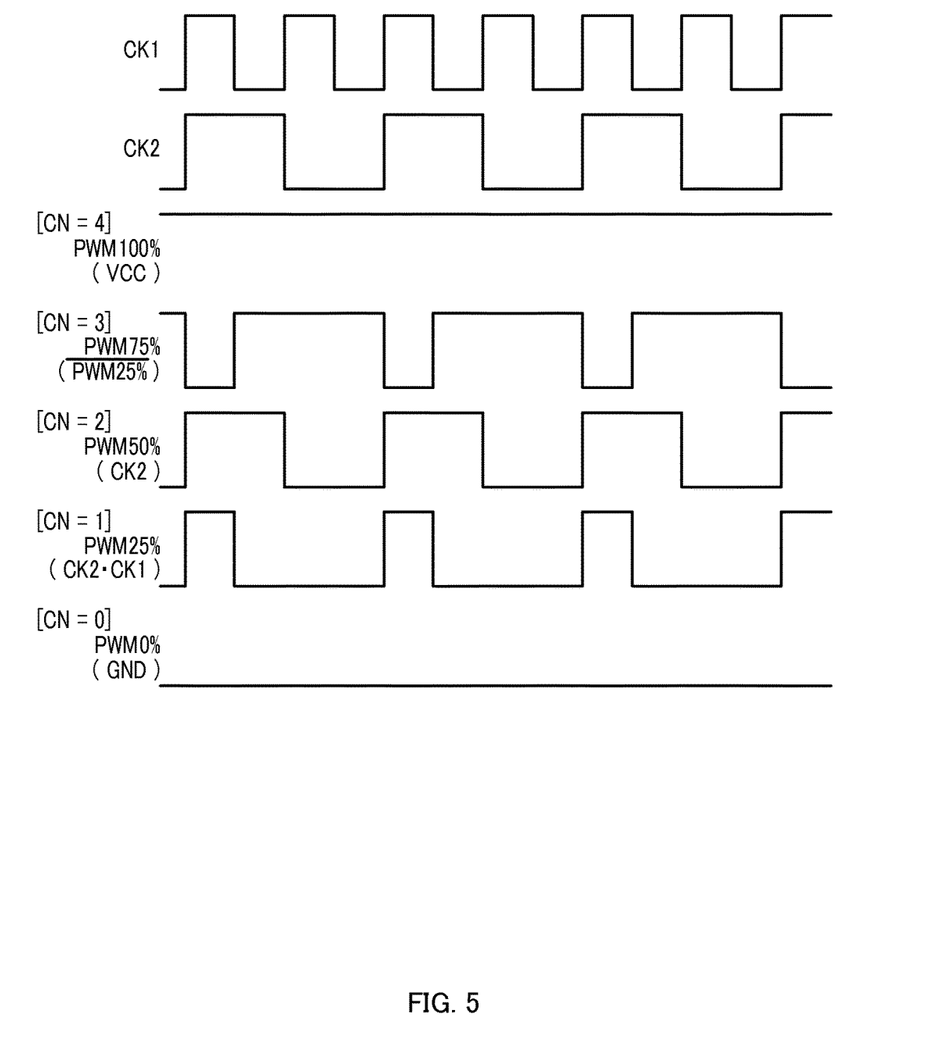
FIG. 5 is a schematic diagram illustrating one example of a relationship of a clock signal CK1 to be inputted to a DFF 121 and a PWM 0% signal to a PWM 100% signal.

Operations will then be described of the switching control circuit 12, the switching circuit 13, and the overheat detecting circuit 14, appropriately referring to FIGS. 4 and 5.

As described above, the diode 142 is disposed in the vicinity of the LED 9. By way of example, when it is assumed that the temperature coefficient of the forward drop voltage Vtp of the diode 142 is −2 mV/° C., and that the temperature of the diode 142 is substantially equal to the temperature Ttp of the LED 9, the voltage Vtp is lowered as the temperature Ttp rises. Therefore, the overheat detecting circuit 14 outputs the overheat detection signal OHD, which goes high when the temperature Ttp of the LED 9 is equal to or higher than the overheat detection temperature Toh. Then, the operations will now be described of the switching control circuit 12 and the switching circuit 13 when the overheat detection signal OHD is high, i.e., when Ttp≥Toh.

When the overheat detection signal OHD is high, the forward/reverse control signal FRC outputted from the OR circuit 134 is constantly 1. The OR circuit 127 outputs the PWM signal that is constantly high, i.e., that has 100% duty ratio.

Therefore, the switching signal generating circuit 128 generates the switching signals so that the motor 6 rotates constantly in the forward direction at a maximum speed. Thus, the fan connected to the rotating shaft of the motor 6 blows a maximum volume of air to the LED 9 itself and the heat sink, so as to cool the LED 9.

The operations will then be described of the switching control circuit 12 and the switching circuit 13 when the overheat detection signal OHD is low, i.e., when Ttp<Toh, appropriately referring to FIGS. 4 and 5.

When the overheat detection signal OHD is low, the forward/reverse signal FR is 0 at the time of turning on the illumination apparatus as a whole or at least the motor drive circuit 1 (S1 of FIG. 4), and thus the forward/reverse control signal FRC outputted from the OR circuit 134 is also 0. Since the switching signal generating circuit 128 is activated in a brake mode causing the motor 6 to stop and the motor brake signal BRK is high, the count value CN of the counter circuit 125 is cleared to become 0. A configuration can be such that the counter circuit 125 has the count value CN thereof cleared in response to the motor stop signal STP in place of the motor brake signal BRK.

It is assumed that a brake system of the motor drive circuit 1 is a short brake system by way of example. In the brake mode of the short brake system, the switching signal generating circuit 128 generates the switching signals so that the output transistors 41 to 43 are turned off and the output transistors 51 to 53 are turned on, for example.

Then, the switching signal generating circuit 128 detects the position of the rotor of the motor 6 based on the comparison result signal CMP, and determines whether the motor 6 has stopped (S2). During the period until the motor 6 has stopped (S2: NO), the brake mode continues.

Then, if the motor 6 stops and the motor stop signal STP goes high (S2: YES), then the count value of the counter circuit 131 is cleared to become 0. Since FRC=0, the mode shifts to a reverse rotation mode to rotate the motor 6 in the reverse direction, and the motor brake signal BRK and the motor stop signal STP go low (S3). A configuration can be such that the counter circuit 131 has the count value thereof cleared in response to the motor brake signal BRK in place of the motor stop signal STP.

If the motor stop signal STP goes low, the counter circuit 131 starts to count in response to the clock signal CKt. Since FRC=0, the counter circuit 131 continues counting until the count value reaches the full count value T2. By way of example, if T2/ft=30 where ft is a frequency of the clock signal, the counter circuit 131 continues counting for 30 seconds (second time) in the reverse rotation mode.

On the other hand, if the motor brake signal BRK goes low, the counter circuit 125 starts to count in response to the clock signal CKd. Since FRC=0, the counter circuit 125 continues counting until the count value CN reaches the full count value D2. By way of example, if D2=4, the counter circuit 125 counts from 0 to 4 in the reverse rotation mode. The selecting circuit 124 selects one out of the five data input signals according to the count value CN of the counter circuit 125, to be outputted as the soft start signal SS.

FIG. 5 illustrates one example of a relationship of the clock signal CK1 to be input to the DFF 121 and the five data input signals of the selecting circuit 124.

The clock signal CK1 with 50% (=½) duty ratio is inputted to the DFF 121, and the DFF 121 outputs the clock signal CK2 with twice the period of the clock signal CK1. Therefore, the DFF 121 is considered as a frequency dividing circuit that frequency-divides the clock signal CK1 by two. Each of the data input signals of the selecting circuit 124 has the same period as that of the clock signal CK2, and these signals become pulse signals whose duty ratios are 0% (=⁰⁄₄), 25% (=¼), 50% (=²⁄₄), 75% (=¾), or 100% (=⁴⁄₄).

Hereinafter, the pulse signal with a % (0≤a≤100) duty ratio will generally be referred to as PWM a % signal.

Therefore, at the start of the reverse rotation mode, the selecting circuit 124 selects the signal in the order of the PWM 0% signal, the PWM 25% signal, the PWM 50% signal, the PWM 75% signal, and the PWM 100% signal, to be outputted as the soft start signal SS. The PWM signal to be outputted from the OR circuit 127 is equivalent to the soft start signal SS, and the duty ratio thereof is increased by 25% (=¼) each until reaching 100% (predetermined duty ratio) (S4).

Therefore, the switching signal generating circuit 128 generates the switching signals according to the PWM signal so that the motor 6 rotates in the reverse direction with the rotating speed thereof being increased in a gradual manner from a standstill state to a maximum speed (target rotating speed) corresponding to the 100% duty ratio. Thus, the fan connected to the rotating shaft of the motor 6 blows air in the direction opposite to the LED 9 itself and the heat sink, with the volume thereof being increased in a gradual manner, and removes the dust of the inside of the illumination apparatus.

The full count signal FL indicates whether the count value of the counter circuit 131 has reached the full count value T2, that is, whether the time T2/ft (second time) has elapsed since the start of the reverse rotation mode (S5). During the period until the count value of the counter circuit 131 reaches the full count value T2 (S5: NO), the reverse rotation mode continues.

Then, if the count value of the counter circuit 131 has reached the full count value T2 and the full count signal FL goes high (S5: YES), then the forward/reverse signal FR is inverted to become 1 and the forward/reverse control signal FRC to be outputted from the OR circuit 134 also becomes 1. With the inversion of the forward/reverse control signal FRC, the switching signal generating circuit 128 shifts to the brake mode, the motor brake signal BRK goes high, and the count value CN of the counter circuit 125 is cleared to become 0 (S6).

Then, the switching signal generating circuit 128 detects the position of the rotor of the motor 6 based on the comparison result signal CMP and determines whether the motor 6 has stopped (S7). During the period until the motor 6 has stopped (S7: NO), the brake mode continues.

Then, if the motor 6 stops and the motor stop signal STP goes high (S7: YES), then the count value of the counter circuit 131 is cleared to become 0. Since FRC=1, the mode shifts to a forward rotation mode to rotate the motor 6 in the forward direction, and the motor brake signal BRK and the motor stop signal STP go low (S8).

If the motor stop signal STP goes low, the counter circuit 131 starts to count in response to the clock signal CKt. Since FRC=1, the counter circuit 131 continues counting until the count value reaches the full count value T1. By way of example, if T1/ft=3600 is, the counter circuit 131 continues counting for one hour (first time) in the forward rotation mode.

On the other hand, if the motor brake signal BRK goes low, the counter circuit 125 starts to count in response to the clock signal CKd. Since FRC=1, the counter circuit 125 continues counting until the count value CN reaches the full count value D1. By way of example, if D1=2, the counter circuit 125 counts from 0 to 2 in the forward rotation mode. The selecting circuit 124 selects one out of the five data input signals according to the count value CN of the counter circuit 125, to be outputted as the soft start signal SS.

Therefore, at the start of the forward rotation mode, the selecting circuit 124 selects the signal in the order of the PWM 0% signal, the PWM 25% signal, and the PWM 50% signal, to be outputted as the soft start signal SS. The PWM signal to be outputted from the OR circuit 127 is equivalent to the soft start signal SS, and the duty ratio thereof is increased by 25% (=¼) each until reaching 50% (predetermined duty ratio) (S9).

Therefore, the switching signal generating circuit 128 generates the switching signals according to the PWM signal so that the motor 6 rotates in the forward direction, with the rotating speed thereof being increased in a gradual manner from the standstill state to the speed (target rotating speed) corresponding to the 50% duty ratio. Thus, the fan connected to the rotating shaft of the motor 6 blows air toward the LED 9 itself and the heat sink to cool the LED 9, with the volume thereof being increased in a gradual manner.

The full count signal FL indicates whether the count value of the counter circuit 131 has reached the full count value T1, that is, whether the time T1/ft (first time) has elapsed since the start of the forward rotation mode (S10). During the period until the count value of the counter circuit 131 reaches the full count value T1 (S10: NO), the forward rotation mode continues.

Then, if the count value of the counter circuit 131 has reached the full count value T1 and the full count signal FL goes high (S10: YES), then the forward/reverse signal FR is inverted to become 0 and the forward/reverse control signal FRC to be outputted from the OR circuit 134 also becomes 0. With the inversion of the forward/reverse control signal FRC, the switching signal generating circuit 128 shifts to the brake mode, the motor brake signal BRK goes high, and the count value CN of the counter circuit 125 is cleared to become 0 (S11). Then, processing of S2 is performed again.

As such, in a normal time where Ttp<Toh is satisfied, the switching control circuit 12 and the switching circuit 13 repeat, in a alternate manner, the forward rotation mode which continues for the first time and the reverse rotation mode which continues for the second time. Therefore, the illumination apparatus illustrated in FIG. 2 is capable of cooling the LED 9 in the forward rotation mode, while removing the dust of the inside thereof in the reverse rotation mode.

At the time of switching between the forward rotation mode and the reverse rotation mode, the shift to the brake mode is performed for a time to stop the motor 6, and at the time of re-starting the rotation of the motor 6, the rotating speed thereof is increased in a gradual manner. Thus, it is prevented that the current rapidly flows through the drive coils 61 to 63 of the motor 6, and the effect on the LED drive circuit 2 is suppressed which is connected to the power supply circuit 3 in common use, so that the flickering of the LED 9 can be prevented.

On the other hand, in an overheat time where Ttp≥Toh is satisfied, the switching control circuit 12 and the switching circuit 13 control so that the motor 6 rotate constantly in the forward direction at the maximum speed. Therefore, the illumination apparatus illustrated in FIG. 2 is capable of blowing the maximum volume of air to the LED 9 itself and the heat sink, so as to be able to cool the LED 9.

As described above, in the motor drive circuit 1 configured to drive the motor 6 so as to rotate the cooling fan of the LED 9, the forward rotation mode which continues for the first time and the reverse rotation mode which continues for the second time are alternately repeated, so that it becomes possible to cool the LED in the forward rotation mode while removing the dust in the reverse rotation mode, without the control from the outside.

At the time of switching between the forward rotation mode and the reverse rotation mode and of the re-starting the rotation of the motor 6, the PWM signal is generated whose duty ratio is gradually increased and the switching signals are generated according to the PWM signal, thereby being able to prevent the current from rapidly flowing through the drive coils 61 to 63 of the motor 6.

The first clock signal (clock signal CK1) is frequency-divided to generate one or more second clock signals (clock signal CK2) each of which has a period $2^n$ times (n representing natural number) the period of the first clock signal and the PWM signal whose duty ratio is increased by $\frac{1}{2}^{n+1}$ each is generated based on the first and the second clock signals, so that it becomes possible to prevent the current from rapidly flowing through the drive coils 61 to 63 of the motor 6 with a circuit area being reduced.

Setting is such that the duration time (first time: one hour) of the forward rotation mode is greater than the duration time (second time: 30 seconds) of the reverse rotation mode and the target rotating speed of the motor 6 in the reverse rotation mode is greater than the target rotating speed of the motor 6 in the forward rotation mode, and therefore it becomes possible to cool the LED 9 with current consumption being reduced and the dust being removed within a short time with efficiency.

In the overheat time where Ttp≥Toh is satisfied, the motor 6 is controlled so as to rotate constantly in the forward direction at the maximum speed, so that the LED 9 can be efficiently cooled with the maximum volume of air.

In the illumination apparatus illustrated in FIG. 2, the motor drive circuit 1 configured to drive the motor 6 and the LED drive circuit 2 configured to drive the LED 9 are connected to the power supply circuit 3 in common use, so that it becomes possible to cool the LED 9 while removing the dust of the inside. In particular, at the time of switching between the forward rotation mode and the reverse rotation mode and of the re-starting the rotation of the motor 6, the PWM signal is generated whose duty ratio is gradually increased and the switching signals are generated according to the PWM signal, so that the effect on the LED drive circuit 2 connected to the power supply circuit 3 in common use is suppressed and the flickering of the LED 9 can be prevented.

In an embodiment described above, a frequency dividing circuit including the DFF 121 frequency-divides the clock signal CK1 to generate the clock signal CK2 having twice the period of the clock signal CK1, but the frequency dividing circuit is not limited thereto. In the motor drive circuit according to an embodiment of the present invention, the frequency dividing circuit can generally be configured such that the first clock signal (clock signal CK1) is frequency-divided to generate one or more second clock signals each of which has a period $2^n$ times(n representing natural number) the period of the first clock signal. In this case, the PWM signal whose duty ratio is increased by $\frac{1}{2}^{n-1}$ each can be generated based on the first and the second clock signals.

Figure 7:
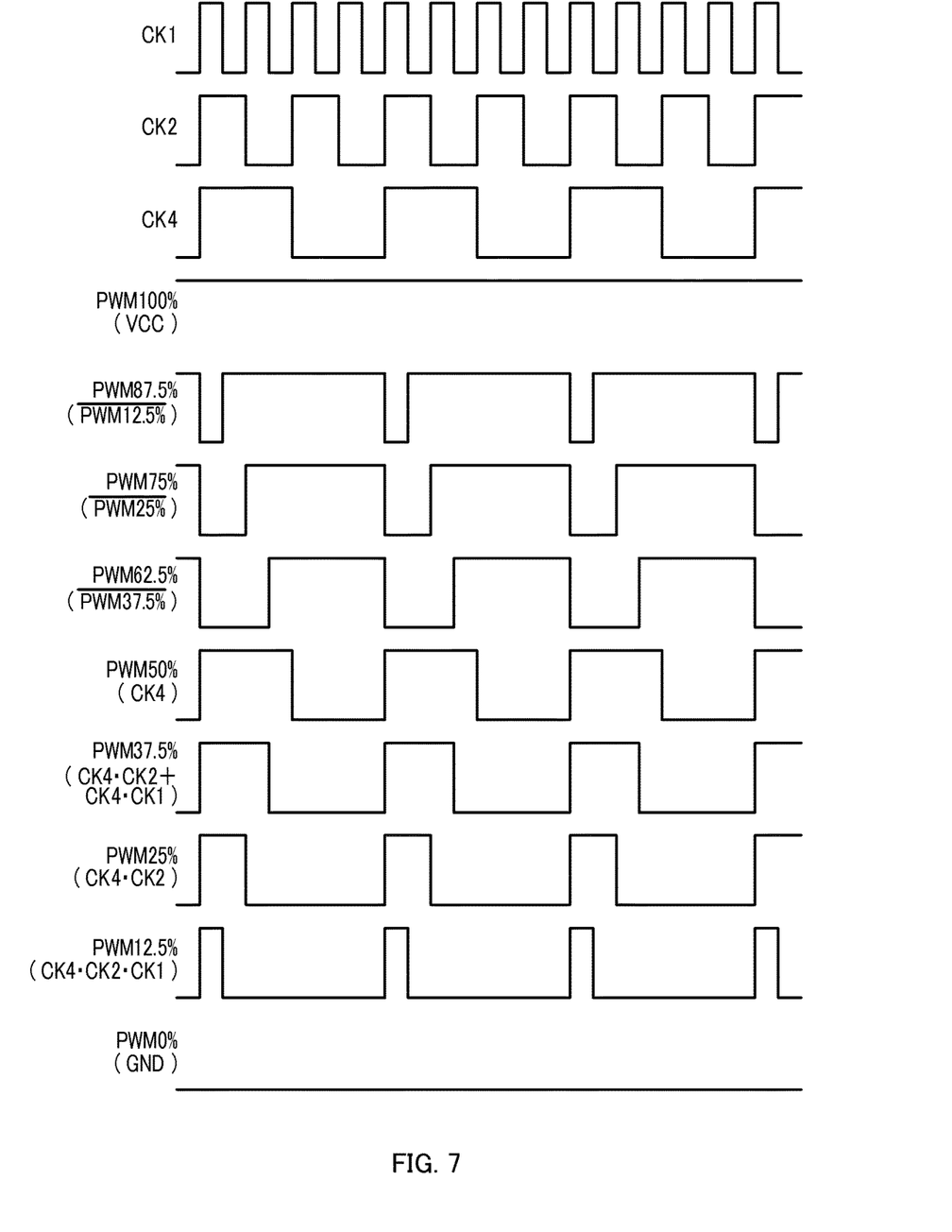
FIG. 7 is a schematic diagram illustrating one example of a relationship of a clock signal CK1 to be inputted to a DFF 1211 and a PWM 0% signal to a PWM 100% signal.

As illustrated in FIG. 6, for example, the frequency dividing circuit including DFFs 1211 and 1212 generates a clock signal CK4 having 4 times the period of the clock signal CK1 in addition to the clock signal CK2. In this case, the clock signals CK2 and CK4 correspond to the second clock signal. Using AND circuits 1221 to 1223, an OR circuit 1224, and inverters 1231 to 1233, the PWM signal whose duty ratio is increased by ⅛ each can be generated as illustrated in FIG. 7, for example.

In an embodiment of the present invention as described above, the case has been described of using the short brake system as a brake system but the brake system is not limited thereto. For example, a reverse-rotation brake system may be used.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. A method for driving a motor with a drive circuit that includes a switching control circuit having a first input, a second input, a third input, a first output, a second output, a third output, a fourth output, a fifth output, a sixth output, and a seventh output, wherein the drive circuit further includes a first transistor having a control terminal, a first current carrying terminal, and a second current carrying terminal, the control terminal of the first transistor coupled to the second output, a second transistor having a control terminal, a first current carrying terminal, and a second current carrying terminal, the control terminal of the second transistor coupled to the third output, a third transistor having a control terminal, a first current carrying terminal, and a second current carrying terminal, the control terminal of the third transistor coupled to the fourth output, a fourth transistor having a control terminal, a first current carrying terminal, and a second current carrying terminal, the control terminal of the fourth transistor coupled to the fifth output and the second current carrying terminal of the fourth transistor coupled to the first current carrying terminal of the first transistor, a fifth transistor having a control terminal, a first current carrying terminal, and a second current carrying terminal, the control terminal of the fifth transistor coupled to the sixth output and the second current carrying terminal of the fifth transistor coupled to the first current carrying terminal of the second transistor, and a sixth transistor having a control terminal, a first current carrying terminal, and a second current carrying terminal, the control terminal of the sixth transistor coupled to the seventh output and the second current carrying terminal of the sixth transistor coupled to the first current carrying terminal of the third transistor, the drive circuit further including a selecting circuit having a first input coupled to the first current carrying terminal of the first transistor and for receiving a first voltage from the motor, a second input coupled to the first current carrying terminal of the second transistor and for receiving a second voltage from the motor, and a third input coupled to the first current carrying terminal of the third transistor and for receiving a third voltage from the motor, the method comprising:

in a first operating state, wherein a temperature of a device is less than a predetermined temperature and the rotor rotating in a first direction, monitoring a rotation speed of the rotor and in response to an overheat detection signal being at first logic level, a forward/reverse indicator signal being at the first logic level, a forward/reverse control signal being at the first logic level, and a motor brake control signal being at a second logic level, generating a braking signal by turning on the first transistor, the second transistor, and third transistor and turning off the fourth transistor, the fifth transistor, and the sixth transistor;

generating a position detection signal in response to detecting a position of a rotor;

in response to the rotation speed of the rotor being zero and the position detection signal, transitioning a motor stop signal to the second logic level, rotating the rotor in a second direction, and transitioning the motor brake signal and the motor stop signal to the first logic level; and gradually starting rotation of the rotor in the first direction.

2. The method of claim 1, wherein gradually starting rotation of the rotor in the first direction comprises incrementally increasing a speed of the rotor in the first direction.

3. The method of claim 2, wherein gradually starting rotation of the rotor in the first direction further includes:

frequency dividing a first clock signal to generate a second clock signal having a first period; and generating a plurality of data input signals from the second clock signal, wherein each data input signal of the plurality of data input signals has the first period.

4. The method of claim 3, wherein generating the plurality of data input signals includes generating each data input signal of the plurality of data input signals having a different duty ratio ranging from 0% to 100%.

5. The method of claim 3, wherein generating the plurality of data input signals includes generating
a first data input signal of the plurality of data input signals having a duty ratio of 0 percent;
a second data input signal of the plurality of data input signals having a duty ratio of 25%;
a third data input signal of the plurality of data input signals having a duty ratio of 50%;
a fourth data input signal of the plurality of data input signals having a duty ratio of 75%; and
a fifth data input signal of the plurality of data input signals having a duty ratio of 100%.

6. The method of claim 3, wherein rotating the rotor in the second direction includes:

frequency dividing a first clock signal to generate a second clock signal having a first period; and generating a plurality of data input signals from the second clock signal, wherein each data input signal of the plurality of data input signals has the first period.

7. The method of claim 6, further including generating a first data input signal having a first duty ratio, a second data input signal having a second duty ratio, and a third data input signal having a third duty ratio, and selecting the data input signals in the order of the first data input signal, the second data input signal, and the third data input signal.

8. The method of claim 1, wherein the first direction is the reverse direction that moves air away from the device and the second direction is the forward direction that moves air toward the device.

9. The method of claim 1, further including in response to operating in a second operating state, wherein a temperature of the device is greater than a predetermined temperature, generating a data input signal having a duty cycle of 100%.

10. The method of claim 1, further including transitioning the motor brake control signal and the motor stop signal to the second logic level after the rotor is rotating in the first direction.

11. The method of claim 10, further including generating a braking signal in response to the motor brake control signal transitioning to the second logic level by turning on the first transistor, the second transistor, and third transistor and turning off the fourth transistor, the fifth transistor, and the sixth transistor.

12. The method of claim 11, further including detecting a position of the rotor and in response to the rotation speed of the rotor being zero, transitioning a motor stop signal to the second logic level, and transitioning the motor brake control signal and the motor stop signal to the first logic level and gradually starting rotation of the rotor in a second direction.

13. The method of claim 12, further including transitioning the motor brake control signal and the motor stop signal to the second logic level.

14. The method of claim 13, further including generating a braking signal in response to the motor brake control signal transitioning to the second logic level by turning on the first transistor, the second transistor, and third transistor and turning off fourth transistor, the fifth transistor, and the sixth transistor.

15. The method of claim 13, further including detecting a position of the rotor and in response to the rotation speed of the rotor being zero, transitioning the motor stop signal to the second logic level, and transitioning the motor brake control signal and the motor stop signal to the first logic level and gradually starting rotation of the rotor in the first direction.

16. The method of claim 15, further including transitioning the motor brake control signal and the motor stop signal to the second logic level.

17. A method for operating a motor having a rotor, comprising:
providing a drive circuit configured for driving the motor, the drive circuit comprising:
a switching control circuit having a first input, a second input, a third input, a first output, a second output, a third output, a fourth output, a fifth output, a sixth output, and a seventh output;
first, second, third, fourth, fifth, and sixth transistors, each transistor having a first current carrying terminal, a second current carrying terminal, and a control terminal, the control terminals of the first transistor, the second transistor, the third transistor, the fourth transistor, the fifth transistor, and the sixth transistor coupled to the second, third, fourth, fifth, sixth, and seventh outputs of the switching control circuit, respectively, the first current carrying terminals of the first, second, and third transistors commonly coupled for receiving a first source of operating potential, the second current carrying terminals of the fourth, fifth, and sixth transistors commonly coupled for receiving a second source of operating potential, the second current carrying terminal of the first transistor coupled to the first current carrying terminal of the fourth transistor, the second current carrying terminal of the second transistor coupled to the first current carrying terminal of the fifth transistor, and the second current carrying terminal of the third transistor coupled to the first current carrying terminal of the sixth transistor; the switching control circuit further comprising a switching signal generating circuit having a first input, a second input, a first output, and a second output;
a selecting circuit having first, second, and third inputs, and first and second outputs, the first input of the selecting circuit coupled to the second current carrying terminal of the first transistor, the second input of the selecting circuit coupled to the second current carrying terminal of the second transistor, and the third input of the selecting circuit coupled to the second current carrying terminal of the third transistor;
a comparator having first and second inputs and an output, the first output of the selecting circuit coupled to the first input of the comparator, the second output of the selecting circuit coupled to the second input of the comparator, and the output of the comparator coupled to the first input of the switching control circuit;
applying braking to the rotor by turning on the first transistor, the second transistor, and the third transistor and turning off the fourth transistor, the fifth transistor, and the sixth transistor;
in response to applying braking to the rotor, a forward/reverse control signal being in a first logic state, and the rotor rotating, monitoring a rotation of the rotor;
in response to ceasing braking of the rotor, the forward/reverse control signal being in the first logic state, and the rotor being in a stationary position, beginning rotation of the rotor at a first speed in a reverse direction in accordance with a first PWM signal having a first duty ratio and starting a timer;
changing a rotor speed of the rotor from a first speed to a second speed in accordance with a second PWM signal having a second duty ratio, where a time less than a first predetermined time has elapsed;
after the first predetermined time has elapsed, in response to applying braking to the rotor, the forward/reverse control signal being in a second logic state, and the rotor rotating, monitoring a rotation of the rotor;
in response to ceasing braking of the rotor, the forward/reverse control signal being in the second logic state, and the rotor being in a stationary position, beginning rotation of the rotor at a third speed in a forward direction in accordance with a third PWM signal having a third duty ratio and starting a timer; and
changing the rotor speed of the rotor from the third speed to a fourth speed in accordance with a fourth PWM signal having a fourth duty ratio, where a time less than a second predetermined time has elapsed.

18. The method of claim 17, wherein changing a rotor speed of the rotor from a first speed to a second speed in accordance with a second PWM signal having a second duty ratio, where a time less than a first predetermined time has elapsed further includes:
changing the rotor speed of the rotor from the second speed to a fifth speed in accordance with a fifth PWM signal having a fifth duty ratio; and
changing the rotor speed of the rotor from the fifth speed to a sixth speed in accordance with a sixth PWM signal having a sixth duty ratio.

19. The method of claim 8, wherein the first duty ratio is 0 percent, the second duty ratio is 25 percent, the third duty ratio is 50 percent; the fourth duty ratio is 75 percent, and the fifth duty ratio is 100 percent.

20. The method of claim 8, wherein changing the rotor speed of the rotor from the third speed to a fourth speed in accordance with a third PWM signal having a third duty ratio, where a time less than a second predetermined time has elapsed further includes:
changing the rotor speed of the rotor from the fourth speed to a seventh speed in accordance with a seventh PWM signal having a seventh duty ratio; and
changing the rotor speed of the rotor from the seventh speed to an eighth speed in accordance with an eighth PWM signal having an eighth duty ratio.

21. A method for operating a motor having a rotor, comprising:
providing a drive circuit configured for driving the motor, the drive circuit including:
a first transistor and a second transistor, the first transistor having a control terminal, a first current carrying terminal, and a second current carrying terminal, the second transistor having a control electrode, a first current carrying terminal, and a second current carrying terminal, the first current carrying terminal of the first transistor coupled to the second current carrying terminal of the second transistor, the first and second transistors configured for transmitting a signal to a rotor;

a switching control circuit having first and second outputs, the first output of the switching control circuit coupled to the control terminal of the first transistor and the second output of the switching control circuit coupled to the control terminal of the second transistor, a first input coupled for receiving an overheat detection signal, a second input coupled for a receiving forward/reverse control input signal, a third input coupled for receiving a control signal, and a third output configured for transmitting a stop signal;

a selecting circuit having a first input coupled to the first current carrying terminal of the first transistor and first and second outputs coupled to a comparator circuit, the comparator circuit having an output coupled to the third input of the switching control circuit;

applying braking to the rotor by turning on the first transistor and turning off the second transistor;

in response to applying braking to the rotor, the forward/reverse control signal being in a first logic state, and the rotor rotating in a forward direction, monitoring a rotation of the rotor; and in response to ceasing braking of the rotor, the forward/reverse control signal being in the first logic state, and the rotor being in a stationary position, beginning rotation of the rotor at a first speed in a reverse direction in accordance with a first PWM signal having a first duty ratio and starting a timer.

22. The method of claim 21, further including:

changing a rotor speed of the rotor from a first speed to a second speed in accordance with a second PWM signal having a second duty ratio, where a time less than a first predetermined time has elapsed;

after the first predetermined time has elapsed, in response to applying braking to the rotor, a forward/reverse control signal being in a second logic state, and the rotor rotating, monitoring a rotation of the rotor; and in response to ceasing braking of the rotor, the forward/reverse control signal being in the second logic state, and the rotor being in a stationary position, beginning rotation of the rotor at a third speed in a forward direction in accordance with a third PWM signal having a third duty ratio and starting the timer.

* * * * *